Jan. 6, 1970  E. UHOR  3,487,614
SHRUBBERY SHAPER AND TRIMMER
Filed Oct. 13, 1966  7 Sheets-Sheet 1

Emil Uhor
INVENTOR.

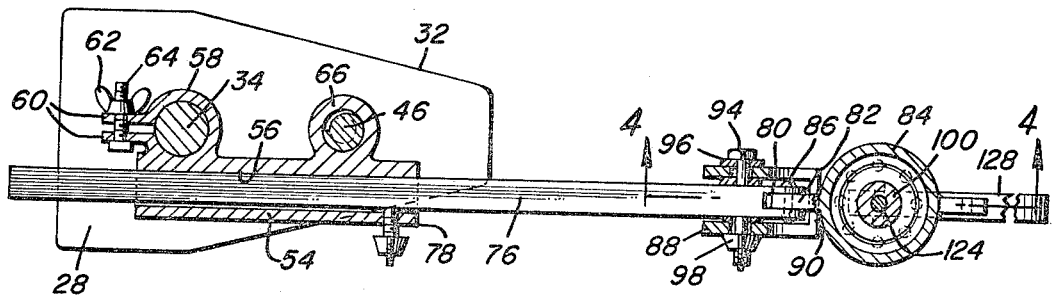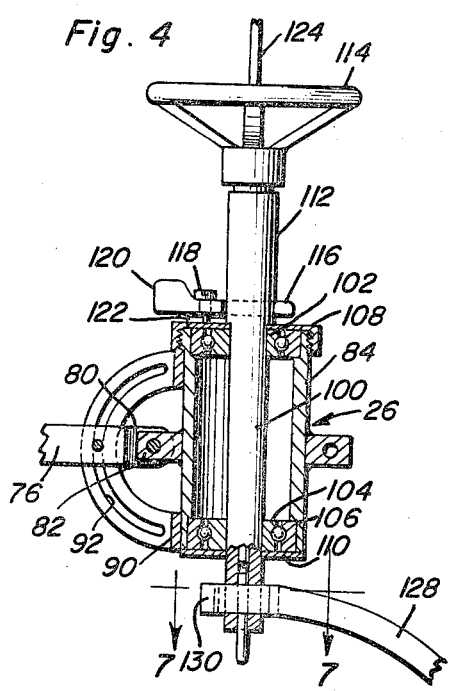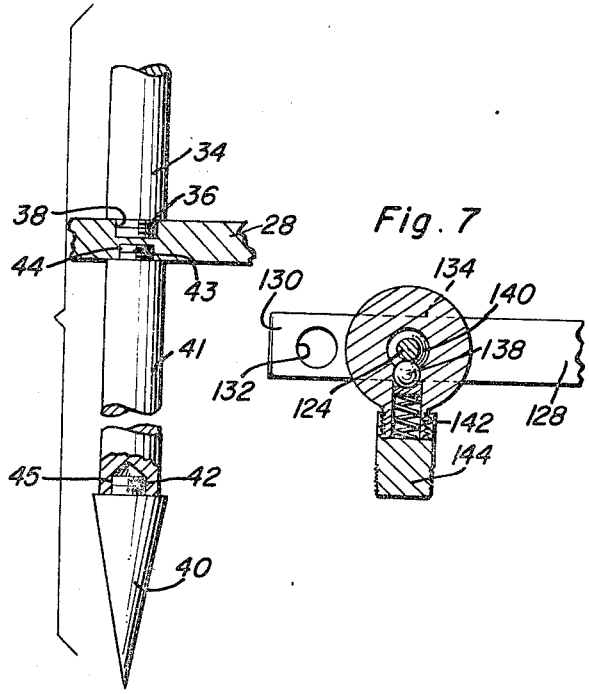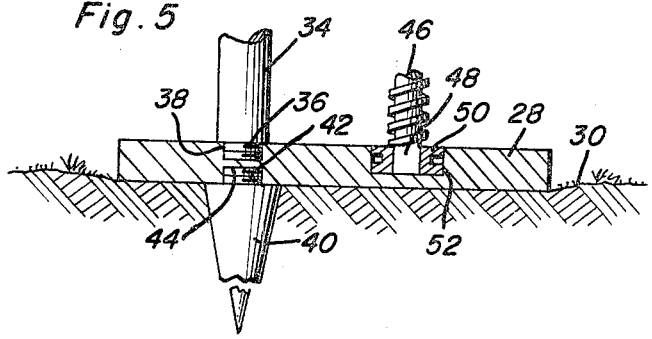
Emil Uhor
INVENTOR.

Jan. 6, 1970          E. UHOR          3,487,614
SHRUBBERY SHAPER AND TRIMMER
Filed Oct. 13, 1966          7 Sheets-Sheet 3
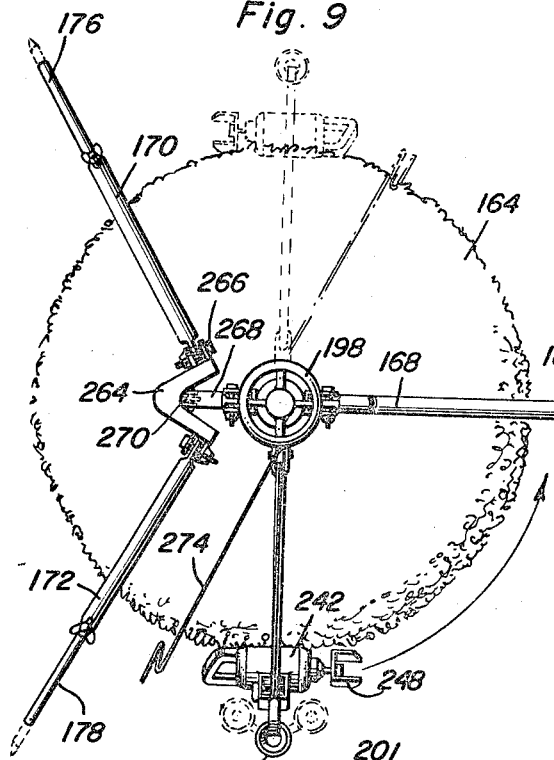
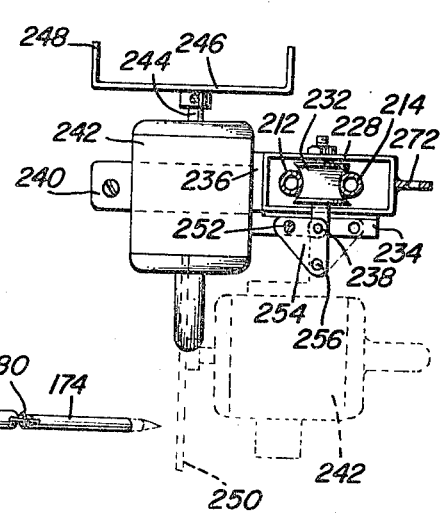
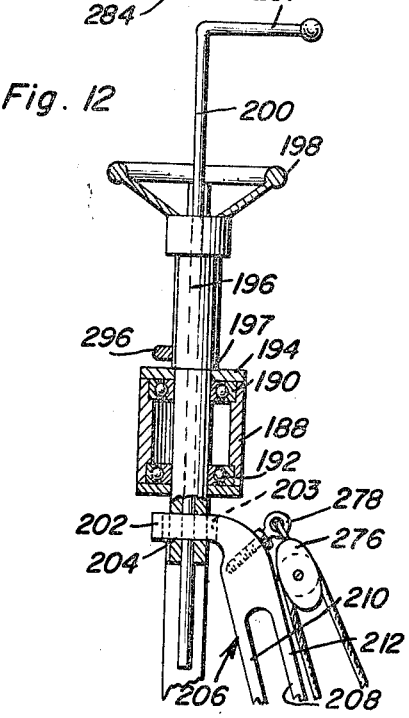
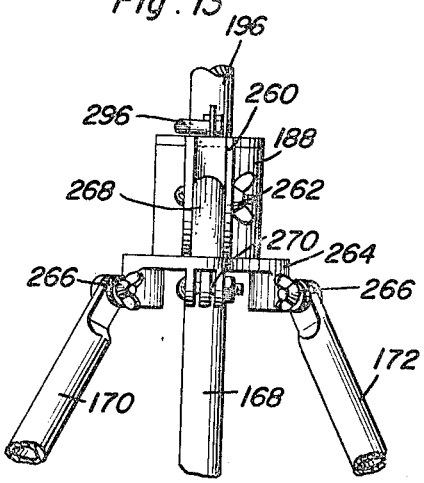
Emil Uhor
INVENTOR.
BY Clarence A. O'Brien
and Harvey B. Jacobson
Attorneys Jan. 6, 1970 E. UHOR 3,487,614
SHRUBBERY SHAPER AND TRIMMER
Filed Oct. 13, 1966 7 Sheets-Sheet 4

Emil Uhor
INVENTOR.

Jan. 6, 1970 E. UHOR 3,487,614
SHRUBBERY SHAPER AND TRIMMER
Filed Oct. 13, 1966 7 Sheets-Sheet 5
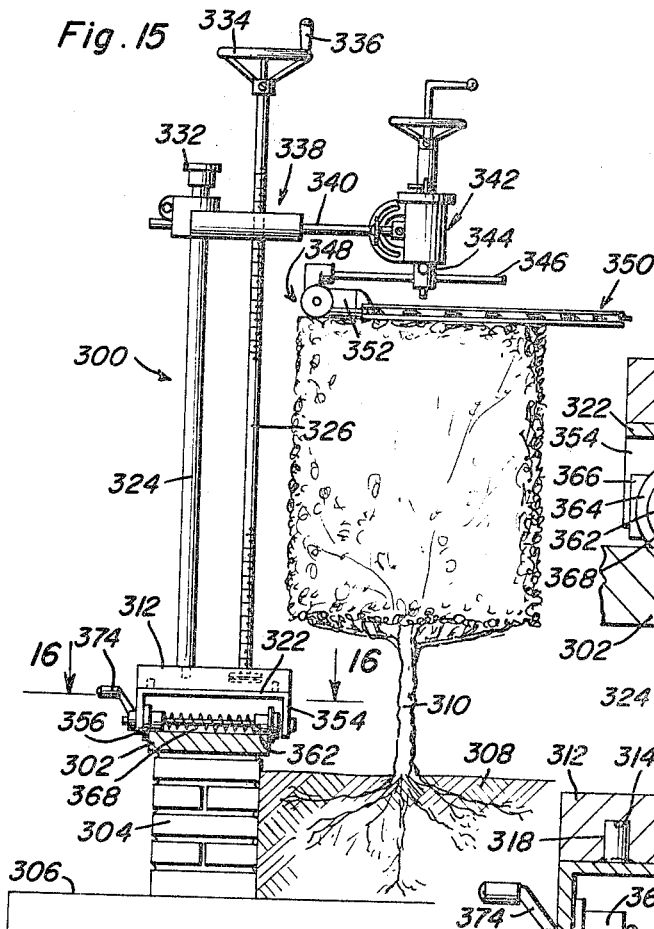
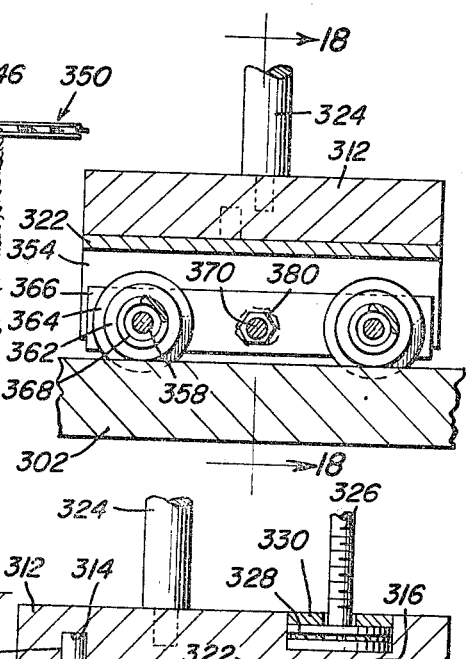
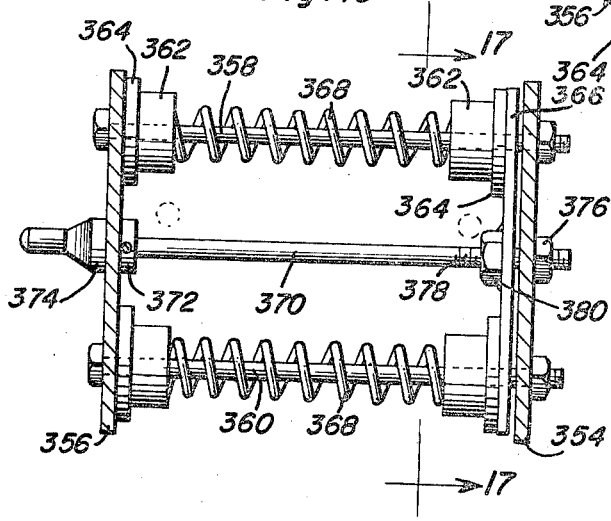
Emil Uhor
INVENTOR.
BY Clarence A. O'Brien
and Harvey B. Jacobson
Attorneys

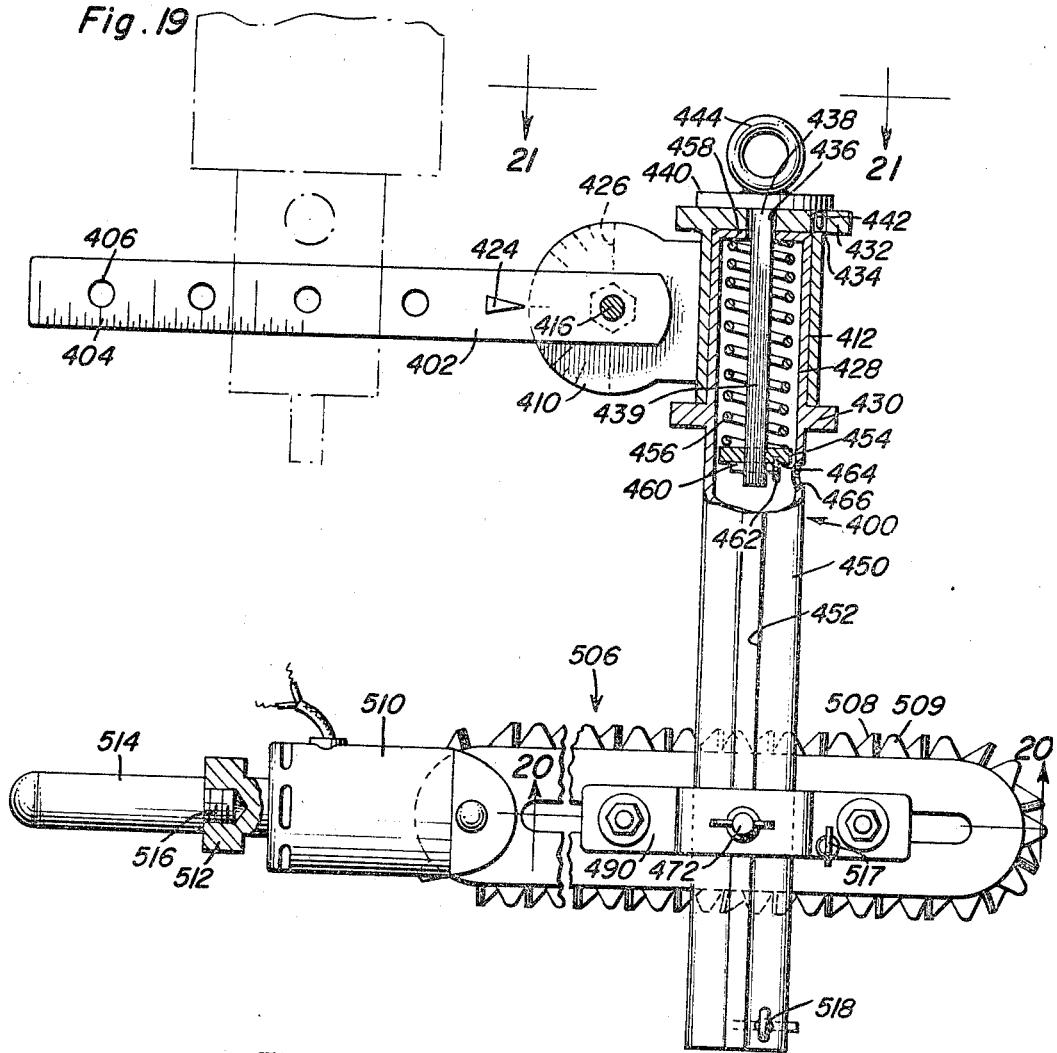
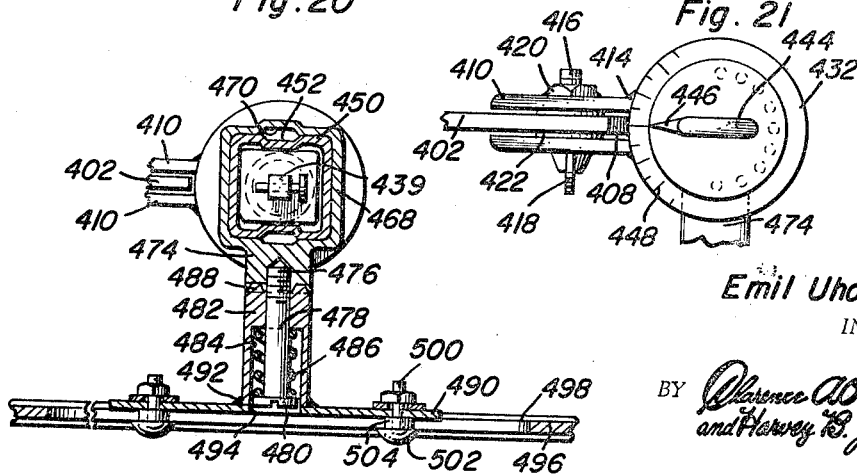

Jan. 6, 1970 E. UHOR 3,487,614
SHRUBBERY SHAPER AND TRIMMER
Filed Oct. 13, 1966 7 Sheets-Sheet 7
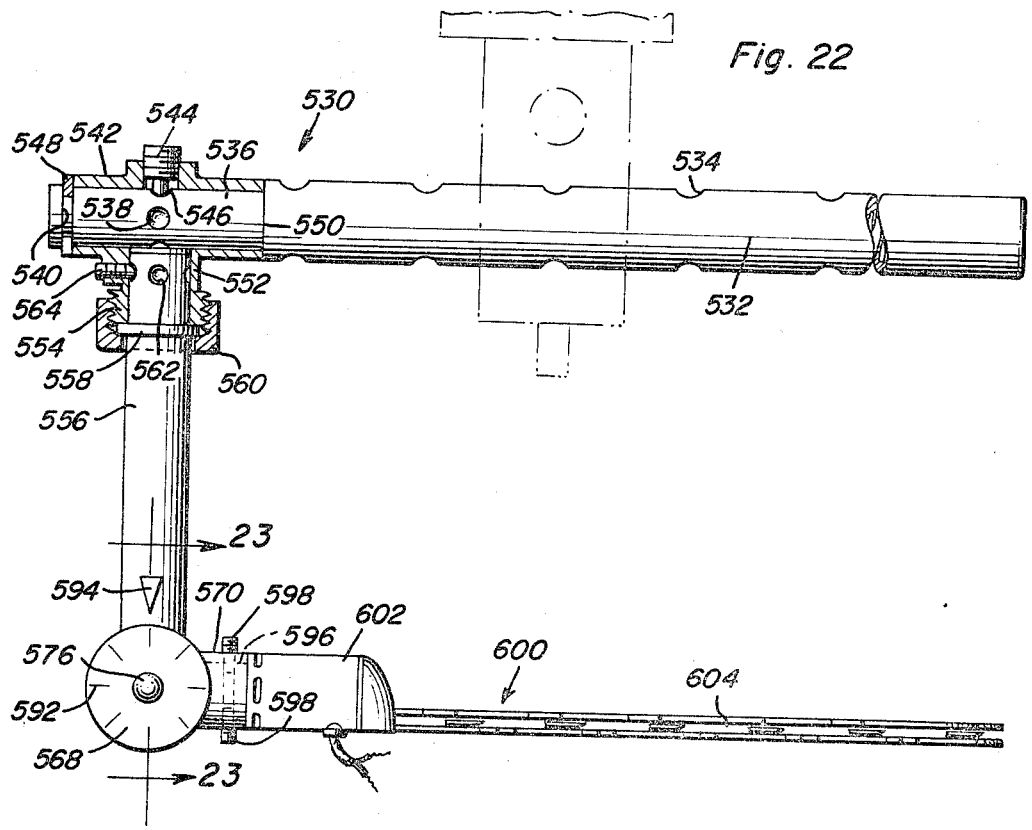
Fig. 22
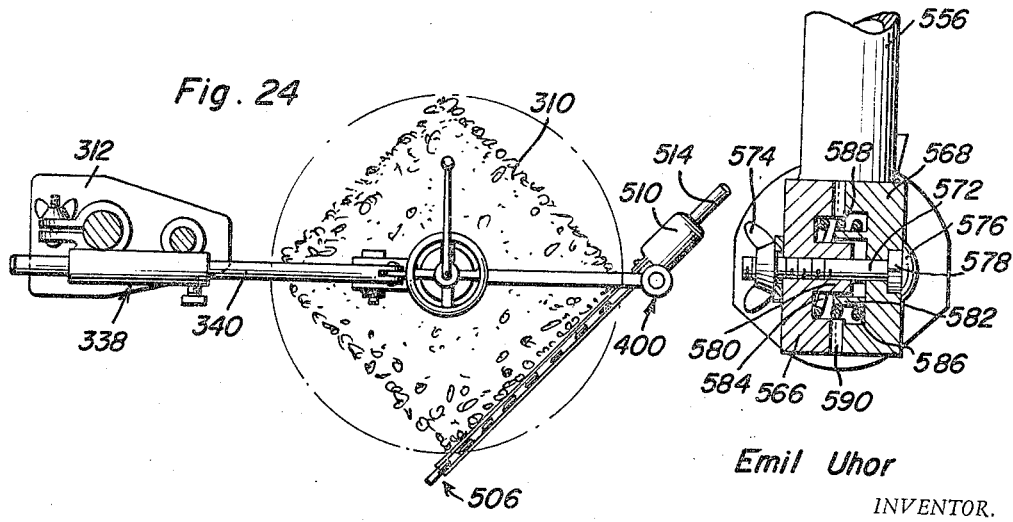
Fig. 23
Fig. 24
Emil Uhor
INVENTOR.
BY Clarence A. O'Brien
and Harvey B. Jacobson
Attorneys United States Patent Office 3,487,614
Patented Jan. 6, 1970

3,487,614
SHRUBBERY SHAPER AND TRIMMER
Emil Uhor, P.O. Box 414, Bowie, Md. 20715
Filed Oct. 13, 1966, Ser. No. 586,549
Int. Cl. A01d 55/22; B27b 9/04
U.S. Cl. 56—233
22 Claims

ABSTRACT OF THE DISCLOSURE

A supporting structure including a head adjustably supported in overlying relation to a shrub to be trimmed and a swingably supported means supported from the head for swinging movement about an axis intersecting the shrub and adapted to support a cutter device therefrom or adapted to be engaged by a cutter device for guiding the cutter device during the trimming operation of the shrub.

---

The present invention generally relates to a device for use in assisting in the trimming and shaping of shrubbery and more particularly relates to a structure supported above the shrub together with a structure depending therefrom for use in shaping or trimming the shrub either by acting as a guide for a cutting implement or a support for such an implement while it is being operated in a manner to trim the shrub to a predetermined shape.

Trimming shrubbery is a time consuming job especially when meticulous care must be practiced in order to shape the shrub in a desired manner. Additionally, the shaping of a shrub requires a high degree of skill inasmuch as it is quite easy to cut back or trim a shrub so that it is out of shape, unsymmetrical and sometimes severe cutback or trimming will damage the shrub.

Accordingly, it is an object of the present invention to provide a shrubbery trimmer and shaper incorporating a rotatably supported assembly orientated above the shrub to be trimmed and shaped and in alignment with the axes of symmetry thereof so that the degree of trimming may be readily controlled and also the shape of the shrub when the trimming operation has been completed may be readily determined thereby introducing specific controls for the trimming and shaping of various shrubs.

Another object of the present invention is to provide a shrubbery trimmer and shaper generally in the form of a supporting stand disposed alongside of a shrub and a laterally extending arm for supporting the assembly above the apex or top of a shrub with the assembly being adjustable both vertically and horizontally and also angularly adjustable for orientating the rotating axis of the guide assembly in alignment with and as an axial extension of the axis of symmetry of the shrub.

A further important object of the present invention is to provide a shrubbery shaper and trimmer having a generally tripodal structure adjustable as to its dimensional characteristics to orientate a rotatable head in overlying and aligned relation to the axis of symmetry of a tree, shrub or the like together with an adjustable and rotatable carried assembly depending from the head and having a powered trimming and shaping device movably mounted thereon.

A further significant object of the present invention is to provide a shaper and trimmer for shrubbery which includes a depending guide assembly having a pointed lower end for engagement with the ground surface to stabilize the guide together with a structure for marking a circular area traversed by the lower end of the guide.

Yet another object of the present invention is to provide a shrubbery trimmer and shaper having a guide assembly associated therewith for guiding a trimming and shaping implement in which the guide assembly includes interchangeable components to enable the characteristics of the guide to be altered.

Another important feature of the present invention resides in the provision of a shaper and trimmer for shrubbery which is supported for movement on a wheeled dolly alongside a row of shrubs, hedges or the like with the dolly being capable of movement along a substantially flat surface or along the top edge surface of a retaining wall with the top surface of the retaining wall forming a guide for the trimmer and shaper.

A further object related to the preceding object is the provision of a novel cutting head for the shaper and trimmer which enables trimming of not only the top surfaces of the shrubs but also the side surfaces thereof into a particular pattern without employing a depending guide structure with the cutter head being adjustable universally and positively locked and controlled for movement in each of its adjusted positions.

Still another feature relating to the preceding objects is the provision of a novel supporting assembly for use in connection with the supporting head which enables the cutter element to be orientated for adjustment for rotation about various vertical, horizontal and inclined axes.

Still another feature of this invention resides in the provision of a shaper and trimmer employed for shrubbery, bushes, trees and the like which is relatively simple in construction, easy to use, effective for its particular purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a plan sectional view taken generally along a plane passing longitudinally of the horizontal supporting arm along section line 3—3 on FIGURE 1;

FIGURE 4 is a vertical sectional view through the supporting head on an enlarged scale along section line 4—4 on FIGURE 3 illustrating the structure thereof;

FIGURE 5 is a detailed sectional view of the supporting stand base taken along section line 5—5 on FIGURE 2 illustrating the structural details thereof;

FIGURE 6 is a fragmental perspective view with portions thereof broken away illustrating the manner in which the effective length of the anchor may be adjusted;

FIGURE 7 is a detailed sectional view taken substantially upon a plane passing along section line 7—7 of FIGURE 4 illustrating the structural details for mounting the shaping structure on the rotatable head;

FIGURE 9 is a top plan view of a modified form of the invention in which the supporting stand is in the form of a tripod and this form of the invention is primarily employed for relatively tall trees or shrubs;

FIGURE 12 is a detailed sectional view taken substantially upon a plane passing along section line 12—12 of FIGURE 10 illustrating further structural details of the rotatable head for the guide assembly;

FIGURE 13 is a detailed elevational view taken generally upon a plane passing along reference line 13—13 of FIGURE 10 illustrating further structural details of the supporting tripod;

FIGURE 14 is a transverse, sectional view taken substantially upon a plane passing along section line 14—14 of FIGURE 11 illustrating further structural details of the supporting structure for the rotary cutter illustrating the manner in which the rotary cutter may be positioned in two different positions for use with different types of cutterheads;

FIGURE 15 is an elevational view illustrating another embodiment of the shaper and trimmer illustrating the manner in which the supporting dolly is guided by the longitudinal cap at the upper edge of a retaining wall or the like;

FIGURE 16 is a plan sectional view taken substantially upon a plane passing along section line 16—16 of FIGURE 15 illustrating the specific structural details of the supporting dolly;

FIGURE 17 is a transverse, sectional view taken substantially upon a plane passing along section line 17—17 of FIGURE 16 illustrating further structural details of the supporting dolly and the relationship thereto to the remainder of the structure;

FIGURE 18 is a detailed sectional view taken substantially upon a plane passing along section line 18—18 of FIGURE 17 illustrating further structural details of the supporting dolly;

FIGURE 19 is a detailed elevational view with portions in section illustrating a modified form af supporting structure for a cutting element illustrating the manner of adjustment thereof;

FIGURE 20 is a detailed sectional view taken substantially upon a plane passing along section line 20—20 of FIGURE 19 illustrating the manner of adjustably supporting the cutting element from a tubular standard;

FIGURE 21 is a plan view taken along reference line 21—21 on FIGURE 19 illustrating the structure for indicating one of the angular positions of the cutting element;

FIGURE 22 is an elevational view, with portions thereof, in section, illustrating another type of supporting head for the trimmer and shaper of the present invention;

FIGURE 23 is a detailed sectional view taken substantially upon a plane passing along section line 23—23 on FIGURE 22 illustrating the structural details of the adjustment structure incorporated into the supporting assembly; and FIGURE 24 is a plan view illustrating the manner in which the peripheral surface of a shrub or tree may be trimmed with a structure such as that illustrated in FIGURE 22.

Figure 1:
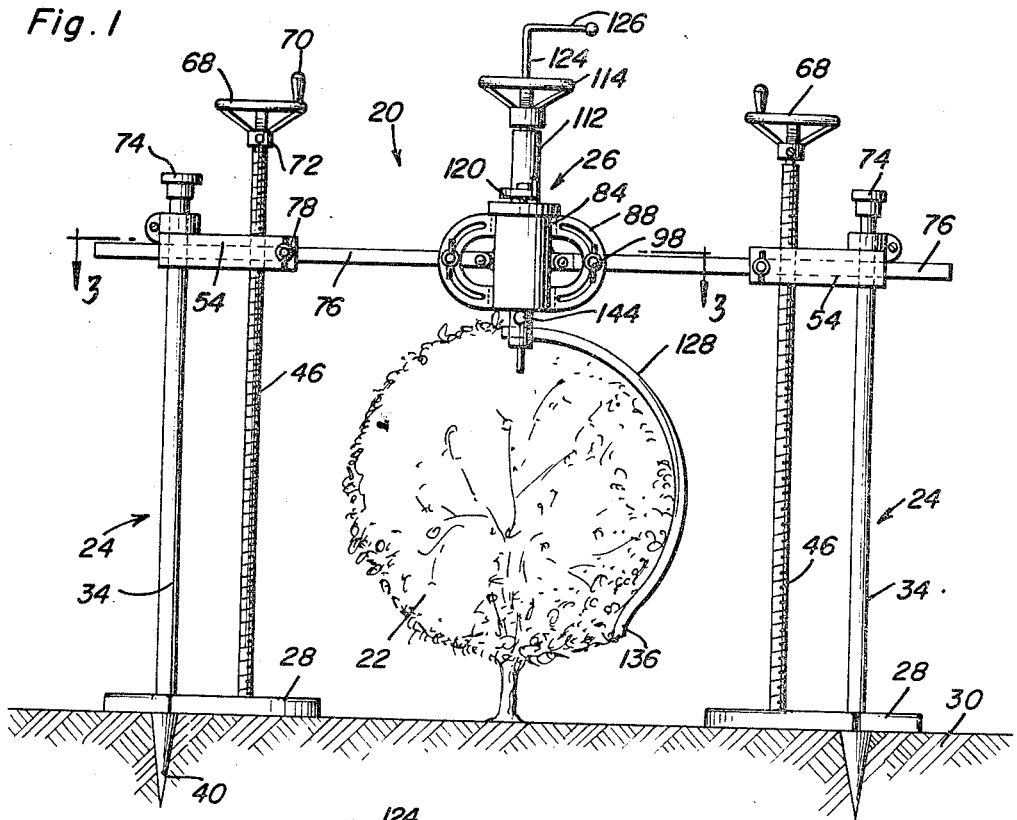
FIGURE 1 is a front elevational view of the shrubbery shaper and trimmer of the present invention illustrating the association thereof with a typical shrub.
Figure 2:
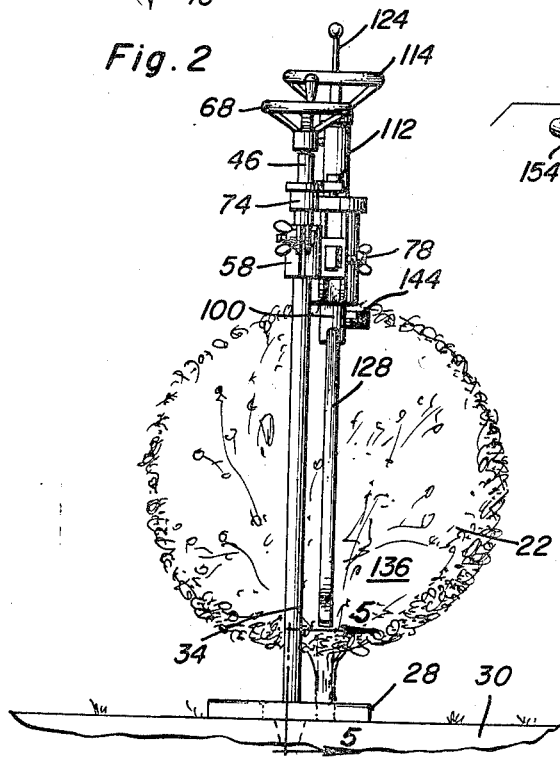
FIGURE 2 is a side elevational view of the construction of FIGURE 1 illustrating the structural details thereof.

Referring now specifically to FIGURES 1-8 of the drawings, this embodiment of the invention is generally designated by the numeral 20 and is primarily intended for use with relatively small shrubs such as a bush 22 although it may be employed with various types of bushes, trees, shrubs and the like. The structure of the shaper and trimmer includes a supporting stand generally designated by the numeral 24 and an adjustable rotary head generally designated by the numeral 26 which is orientated in overlying relation to the shrub 22 with the rotational axis thereof in alignment with the axis of symmetry of the shrub 22 which will normally be along the longitudinal axis of the trunk of the shrub or even if the trunk is not vertical, the axis of rotation of the head 26 will still be in aligment with the axis of symmetry of the shrub 22.

The supporting stand 24 includes a base plate 28 having planar upper and lower surfaces with the lower surface adapted to be engaged with the ground surface 30 so that it is orientated generally in a horizontal plane. The configuration of the base plate 28 may vary and the dimensional characteristics thereof may vary with FIGURE 3 illustrating one arrangement which eliminates certain of the sharp corners by having converging edge surfaces as indicated at 32.

Extending upwardly from an outer end portion of the base plate 28 is an elongated supporting standard 34 having a reduced screw threaded extension 36 at the lower end thereof received in a screw threaded socket 38 in the upper surface of the base plate 28. For anchoring the base plate 28 on the ground surface 30, a depending pointed ground anchor 40 is attached to the base plate 28 in alignment with the standard 34 and includes a reduced threaded extension 42 threadedly engaged in a threaded socket 44 in the base plate 28 and communicating with the lower surface thereof whereby the pointed ground anchor 40 may be forced into the ground surface 30 thus anchoring the base plate 28 in position in relation to the shrub 22.

Spaced inwardly from the standard 34, an elongated externally threaded rod 46 is rotatably supported from the plate 28 by employing a cylindrical axial extension 48 received in a bearing 50 which is disposed in a socket 52 opening to the upper surface of the base plate 28 thus rotatably supporting the threaded rod 46 for rotation about its longitudinal axis which is parallel with the longitudinal axis of the supporting standard or rod 34.

Mounted adjustably on the standard 34 is a horizontally disposed tubular bracket 54 having a passageway 56 extending longitudinally thereof. The bracket 54 is provided with a split sleeve 58 integral therewith which encircles and is adjustably mounted on the standard 34. The split sleeve 58 is provided with a pair of spaced projecting ears or lugs 60 which are interconnected by a clamp bolt 62 of any suitable type such as one provided with a wing nut 64 for ease of clamping and releasing the split sleeve 58 in relation to the standard 34 so that when the nut 64 is loosened, the bracket 54 may move vertically on the standard 34 and when the nut 64 is tightened, the bracket 54 will be anchored in position on the standard 34 thereby providing for vertical adjustment of the bracket 54.

Also provided on the bracket 54 and disposed inwardly and in parallel relation to the sleeve 58 is an internally threaded sleeve 66 which is in screw threaded engagement with the externally threaded rod 46 so that as the rod 46 is rotated, the threaded sleeve 66 will be moved vertically thus moving the bracket 54 and the sleeve 58 vertically for providing manual adjustment of the bracket 54 in relation to the base plate 28. The upper end of the threaded rod 46 is provided with a handwheel 68 having a handle 70 thereon for facilitating rotation of the threaded rod 46. The handwheel 68 may be secured to the threaded rod 46 in any suitable manner such as by a setscrew 72 extending through the hub of the wheel 68 and engaging a polygonal portion of the threaded rod 46. Also, the upper end of the standard 34 is provided with a cylindrical cap 74 which not only limits the upward movement of the sleeve 58 but also forms a handle structure for ease of manipulation of the stand 24 when inserting the ground anchor 40 into the ground 30.

Adjustably supported in the passage 56 in the bracket 54 is an elongated support arm 76 which extends horizontally through the passage 56 and is adjustable longitudinally therein with a threaded setscrew or thumb screw 78 being provided for adjustably locking the support arm 76 in a desired position in relation to the bracket 54. The inner end of the support arm is bifurcated as at 80 for receiving a mounting lug 82 integral with a cylindrical sleeve 84 which forms a portion of the head assembly 26. The mounting lug 82 is pivotally attached to the bifurcated end portion 80 of the support arm 76 by a suitable fastener such as a rivet 86 or the like to enable adjustment of the cylindrical sleeve 84 in an angular orientation in relation to the longitudinal axis of the support arm 76. Means is provided for locking the position of the sleeve 84 in relation to the arm 76 and this means includes a pair of arcuate rigid straps or plates 88 having the end portions rigidly interconnected by webs 90 which are fixed to the sleeve 84 as by welding or the like. The straps 88 may be independent of each other and welded directly to the sleeve 84. This structure is illustrated in FIGS. 3 and 4 in which the webs which interconnect the ends of the arcuate plates or straps 88 are spaced from each other and are actually the width of the arcuate plates 88. Each of the arcuate plates 88 has an arcuate slot 92 formed therein which has an arc of curvature with the center corresponding with the fastener rivet 86. Extending between the plates 88 and through the arcuate slots 92 and through the support arm 76 is a clamp bolt 94 provided with suitable friction washers 96 and a wing nut 98 all of which will cooperate to lock the support arm 76 and the cylindrical sleeve 84 in adjusted position. By loosening the nut 98, the cylindrical sleeve 84 may be adjusted angularly so that the longitudinal axis thereof may be varied in relation to the longitudinal axis of the support arm 76.

Centrally disposed in the sleeve 84 is a tubular supporting member 100 which is journaled in suitable bearing assemblies 102 and 104 at the upper and lower ends of the sleeve 84 respectively. The bearing assemblies 102 and 104 may be conveniently ball bearings, roller bearings or any other suitable type of bearings and as illustrated, the ball bearing assemblies are seated against an internal shoulder 106 defined in each end of the sleeve 84 and are retained against the shoulder by an upper screw threaded end cap 108 and a lower end cap 110 which may also be screw threaded or detachably supported in any suitable manner to enable replacement of the bearing assemblies if this such replacement becomes necessary. Thus, the tubular support 100 may rotate in either direction in relation to the cylindrical sleeve 84 with the rotational axis thereof generally corresponding to the longitudinal axis of the sleeve 84 so that when the sleeve 84 is adjusted in relation to the arm 76, the rotational axis of the tubular support 100 may also be adjusted in any direction.

The upper end of the tubular support 100 is enlarged at 112 to form a shoulder for resting against the cap 108 and to also provide attachment for a handwheel 114 to enable rotation of the tubular support 100. A spring biased friction brake 116 is pivotally mounted on the cap 108 by a fastening bolt 118 which also serves as a pivot point for the brake 116. A handle 120 is provided for the brake and a spring 122 biases the arcuate end portion of the brake 116 which engages the external surface of the enlarged upper end portion 112 of the tubular support 100 thus frictionally retaining it in adjustable position about its rotating axis.

An elongated rod 124 extends upwardly from the tubular support 100 and extends throughout the length thereof with the lower end depending below the lower end of the tubular support 100 and the upper end extending above the handwheel 114. At the upper end of the rod 124, a laterally extending handle or rod 126 is provided which is perpendicular to the rod 124. This structure serves as a sighting rod for enabling both the vertical and horizontal orientation of the head 26 to be visually sighted or if more accuracy is desired, bubble levels may be incorporated therein or a transit or other geometrical instrument may be employed for properly orientating the vertical 124 and horizontal rod 126 in relation to the axis of symmetry of the tree. This greatly facilitates the orientation of the head assembly 26 in relation to the shrub 22.

An arcuate guide member 128 is attached to the lower end of the tubular support 100. The arcuate guide 128 is provided with an attaching portion 130 having a plurality of spaced holes 132 extending therethrough. The attaching end portion 130 of the arcuate guide 128 is inserted through a corresponding passage 134 in the lower end of the tubular support 100 and the lower end of the vertical sighting rod 124 is then inserted through one of the holes 132 thus anchoring the arcuate guide rod 128 adjustably and detachably in position on the lower end of the support 100. As illustrated in FIGURE 1, the lower end of the arcuate guide rod 128 may be slightly outwardly flared as at 136 to eliminate any tendency of the lower end of the guide rod 128 to dig into the shrub 22. The guide rod 128 will serve as a guide for either a manual or powered cutting and trimming device such as conventional manual shears or conventional power operated shears which are normally employed for trimming shrubs and which can be adapted to ride on or against guide rod 128.

The sighting rod 124 is retained vertically in position by the provision of a ball detent 138 which extends into the center of the tubular support 100 and engages a peripheral groove 140 formed in the lower end of the sighting rod 124. A spring 142 biases the ball detent 138 into the groove 140 and a retaining cap 144 is provided for retaining the spring 142 and ball detent 138 in position so that the sighting rod 124 may be normally rotated along its longitudinal axis without altering the position of the tubular support 100 or the guide rod 128. When it is desired to change the guide rod 128, it is only necessary to urge the sighting rod 124 upwardly thus causing the ball detent 138 to retract by compressing the spring 142 thereby enabling the attaching end portion 130 of the guide rod 128 to be withdrawn from the passage 134. Of course, the guide rod 128 is rotated about the rotational center of the tubular support 100 by grasping the handwheel 114 and rotating it thus causing the rod 128 to swing in a circular path.

Figure 8:
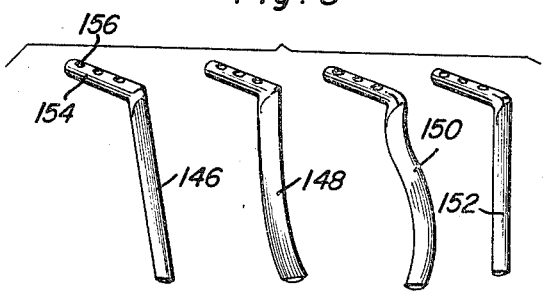
FIGURE 8 is a group perspective view illustrating several embodiments of the guiding structure for enabling different shapes to be formed on the shrub.
Figure 10:
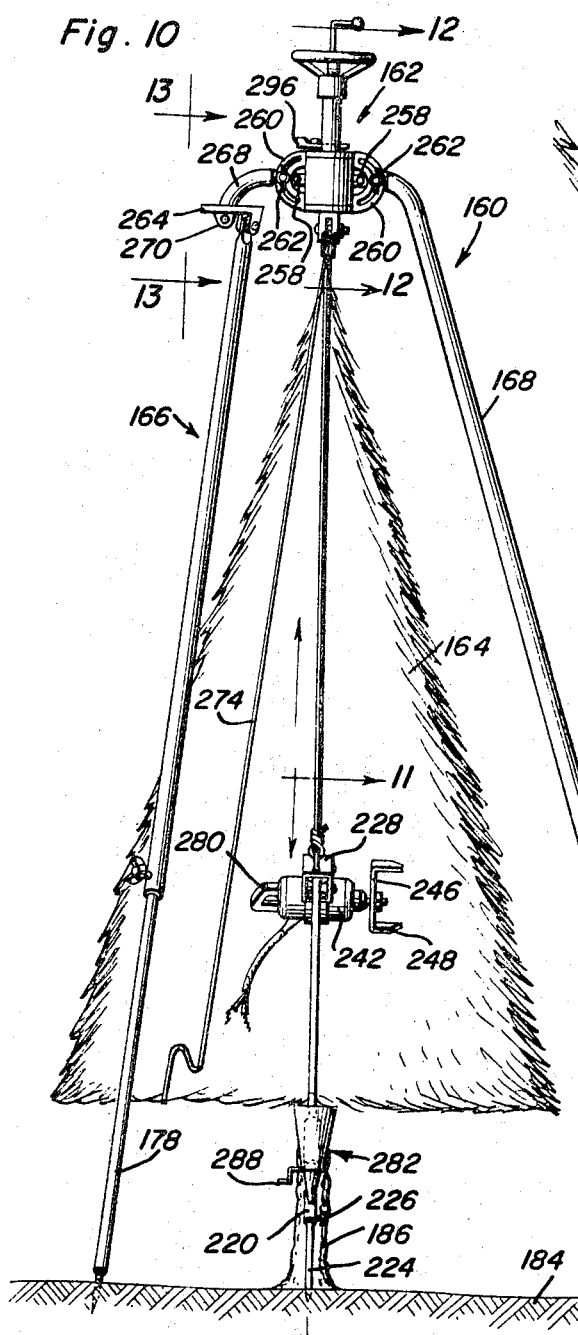
FIGURE 10 is a side elevational view of the construction of FIGURE 9.
Figure 11:
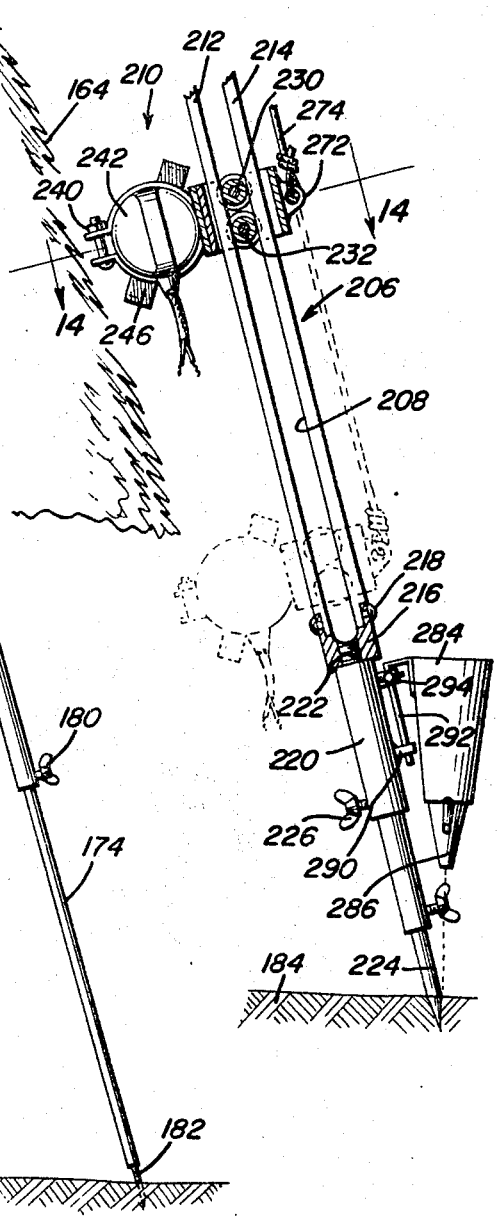
FIGURE 11 is a detailed sectional view taken substantially upon a plane passing along section line 11—11 of FIGURE 10 illustrating further structural details of the guide assembly for the shaper and trimmer.

FIGURE 8 illustrates various types of guide rods such as indicated by numerals 146, 148, 150 and 152 each of which has an attaching portion 154 corresponding with the attaching portion 130 of guide rod 128 and a plurality of apertures 156 corresponding with the apertures 132 in guide rod 128 (see FIGURE 7). The shapes and configurations of the guide rod may vary depending upon the final shape to be given the shrub or tree. For example, the guide rod 146 may be employed where the final shape of the shrub or tree is to be generally conical whereas the guide rod 148 may be employed where the final shape of the shrub or tree is to be generally conical but with the concave surface incorporated therein. It will be appreciated that the shapes and configurations of the guide rod may vary depending upon the desires of the individual home owner.

FIGURE 6 illustrates an extension rod 41 having a threaded stud 43 engaged in socket 44 in plate 28 and a threaded socket 45 receiving stud 42 on anchor 40 for lengthening the anchor when required.

In some uses of the present construction, a single stand 24 may be employed while in other uses of the invention, two stands 24 may be provided. These two stands as illustrated in FIGURE 1 provide a stable structure while the use of a single stand will suffice in some instances especially when the device is used with relatively small shrubs. The base plate 28 is weighted so that the structure will not tip over during use.

While the guide rod 128 is set forth as being employed with an independently movable cutting apparatus, it is pointed out that a suitable carriage may be mounted directly on the guide rod and attached directly to a powered or manual cutting device which would enable such a device to be moved in a predetermined path for guiding the cutting components of a cutting apparatus to shape the tree during movement along the guide rod. Also, the guide rod may be of various dimensions and of various configurations depending upon the shape and size of the shrub involved. The specific structure enables easy and quick detachment of the guide rods to enable easy interchange thereof and the specific mounting apertures 156 enables the radius of movement of the guide rods in their circular path to be easily adjusted to accommodate various size shrubs which are to be shaped or trimmed in generally the same pattern. The sighting rod which may be vertically adjustable enables the rotational axis of the guide rod to be properly orientated in relation to the axis of symmetry of the tree and also in proper relation to the ground surface to provide a structure which will quite readily and simply guide the guide rod during its movement and also accurately control the trimming and shaping operation whether it be conducted by employing a pair of manual trimming shears, clippers or the like or a power operated trimmer. The device may be used with a stand of the cantilever type or may be employed with two stands as desired and as deemed appropriate in view of the size relationships of the various components incorporated into this form of the invention.

Referring now specifically to FIGURES 9-14, the form of the invention disclosed in these figures of the drawings is generally designated by numeral 160 and may be broadly considered a tripod supporting arrangement for supporting a rotary head generally designated by the numeral 162 in overlying relation to a tree 164 or the like. This form of the invention is primarily constructed for use with relatively tall trees and while it is illustrated to shape and trim a tree in generally a conical configuration, it is pointed out that other shapes and configurations may be formed by employing this form of the invention.

The rotary head 162 is supported by a supporting stand generally designated by the numeral 166 which is in the form of a tripod and includes three tubular legs 168, 170 and 172 each of which has a telescopically received lower section 174, 176, and 178. A wing type thumb screm 180 is employed for locking the lower sections of the legs in adjustable telescopic relation to the upper sections of the legs thereby enabling the effective length of the legs to be adjusted. The lower end of each lower section 174, 176 and 178 is provided with a screw threaded adjustable pointed ground anchor 182 to enable firm penetration of the ground surface 184 to anchor the tripod in desired position in relation to the tree 164 and generally in equally spaced relation to the tree trunk 186.

The rotary head 162 is quite similar to the rotary head employed in the embodiment of the invention illustrated in FIGURES 1-8 and includes a cylindrical sleeve 188 having a bearing assembly 190 at the upper end thereof and a bearing assembly 192 at the lower end thereof together with closure plates or caps 194 closing the end of the sleeve 188 and retaining the bearing assemblies in place. A tubular support 196 extends through the sleeve 188 and is journaled by the bearing assemblies 190 and 192 for rotational movement about its longitudinal exis and a shoulder 197 is provided thereon for engaging cap 194. The upper end of the support 196 is provided with a handwheel 198 for rotation thereof and a sighting rod 200 extends down through the tubular support 196 and the upper end of the sighting rod 200 is provided with a lateral extension 201 at right angles to the vertical component of the sighting rod 200 for use in orientation of the rotational axis of the tubular support 196 in alignment with the axis of symmetry of the tree 164.

The lower end of the tubular support 196 is provided with a transverse passage 204 receiving the attaching end portion 202 of an elongated guide member 206 which has an elongated longitudinal slot 208 formed therein which extends substantially the length of the guide member 206 for guidingly supporting and retaining a cutter assembly generally designated by numeral 210. The guide member 206 is formed by two spaced apart tubular rods 212 and 214 as illustrated in FIGURE 14 and the lower ends of these rods are interconnected by a connecting adapter 216 secured thereto by any suitable means such as screw threaded fasteners 218 or the like to enable removal of the adapter to provide for assembly and disassembly of the cutter assembly with the guide member 206 and to enable extensions to be attached.

Also attached to the connector adapter 216 is a telescopic anchoring member 220 having a reduced screw threaded projection 222 connected with a threaded socket in the adapter 216. The brace 220 is in the form of a multiple section tubular member with the lowermost section being in the form of a pointed ground anchor 224 for supportingly engaging the ground surface and anchoring and supporting the lower end of the elongated guide member 206 in place. Wing type thumb screws 226 are provided for retaining the adjustable sections of the sectional brace 220 in longitudinally adjusted position.

The cutter assembly 210 includes an open rectangular frame 228 having a pair of centrally disposed axle forming bolts 230 extending therethrough which journal grooved rollers 232 which receive on the diametrically opposed peripheral portions thereof the tubular members 212 and 214 which form the guide member 206. Extending from one long surface of the rectangular frame 228 is a bracket 234 which pivotally supports an L-shaped bracket 236 for pivotal movement about a hinge axis 238. Mounted on the bracket 236 is a split clamp 240 for clampingly engaging an electric motor 242 having an output shaft 244 with a detachable cutting element 246 mounted thereon. The cutting element 246 has laterally extending end portions 248 forming the cutting edges thereof and when this arrangement is employed, the rotational axis of the shaft 244 is generally tangential to the tree 164 as illustrated in FIGURE 9. However, a straight type of cutting blade such as at 250 may be employed in which event the L-shaped bracket 236 is pivoted about the pivot pin 238 and orientated with the motor 242 in dotted line position as illustrated in FIGURE 14. A retaining pin or bolt 252 is provided for insertion through the bracket 234 and the bracket 236 when in the position illustrated in full line in FIGURE 14. The bracket 236 is provided with a projecting gusset plate of right triangular configuration as designated by numeral 254 and which has an aperture in the apex thereof as designated by numeral 256 for orientation in alignment with a corresponding opening in the bracket 234 when the L-shaped bracket 236 is pivoted 90° into perpendicular relation to the full line position illustrated in FIGURE 14 or into the dotted line position as illustrated in FIGURE 14 thus securely and detachably locking the motor with the rotational axis either in tangential relation to the tree 164 as illustrated in FIGURE 9 or in generally radial relation thereto so that the flat cutting blade 250 may be employed for trimming the tree.

The upper end of leg 168 is pivotally connected to a lug 258 rigid with the sleeve 188 and slotted arcuate plates 260 and a clamping bolt 262 are provided for locking the leg 168 in adjusted position in relation to the sleeve 188. The other legs 170 and 172 are pivotally connected at their upper ends to a substantially V-shaped plate 264 by pivot bolts 266. The V-shaped plate 264 has an upwardly and inwardly extending arcuate member 268 pivoted below the apex thereof at 270 and the upper inner end of the arcuate member 268 is pivotally attached to a lug secured to the sleeve corresponding and identical in structure to the lug 258 and this attachment is designated by the same reference numeral. Correspondingly, arcuate slotted plates 260 and fastener bolt 262 are employed for securing arcuate member 268 in angularly adjusted position thus in effect adjusting the legs 170 and 172 in relation to the rotary head 162.

This construction enables the device to be laid out on the ground surface and then the single leg 168 grasped and moved in the form of a lift member and prop to orientate the legs in their adjusted position and by adjusting the various legs and repositioning the legs, the position of the rotary head 162 may be adjusted and the angular orientation thereof varied so that the rotational axis of the rotary head and particularly the tubular support 196 will be accurately positioned in relation to the axis of symmetry of the tree 164.

In order to enable a relatively tall tree to be trimmed without employing a ladder, a structure is provided for raising and lowering the cutter assembly 210. This structure includes a laterally extending apertured lug or bracket 272 on the outer edge of the rectangular frame 228. A flexible line or rope 274 is attached to the apertured lug 272 and extends upwardly along the guide member 206 over a pulley block 276 at the upper end of the guide member 206. The pulley block 276 is anchored to the guide member 206 as by an eyebolt 278 or any other suitable mechanism for supporting the pulley block in position. The free end portion of the flexible line 274 extends downwardly to the ground surface so that a person disposed on the ground surface may move the cutter assembly 210 vertically along the guide member 206 and as it rotates by virture of the motor 242 being electrically powered, the tree 164 will be trimmed. Of course, at the lower range of movement of the cutter assembly 210, it may be manually manipulated by grasping the motor and the usual handle or handles 280 provided thereon.

Mounted on the adjustable anchor or brace 220 is a marker assembly 282 in the form of a container 284 having a discharge spout or nozzle 286 which is orientated in alignment with the pointed end of the anchor 224. A suitable control valve assembly 288 such as butterfly type of flap valve is employed for selectively dispensing material from the container 284. The upper tubular section on the brace 220 is provided with a pair of laterally extending support lugs 290 receiving a support rod 292 that is fixedly attached to the container 284 in generally parallel relation to one side wall thereof. A thumb screw 294 is provided on one of the lugs 290 for locking the rod 292 about its longitudinal axis thus locking the container 284 in an adjusted position as illustrated in FIGURE 9 either in the full line position or in a dotted line position thus enabling positioning of the discharge spout 286 in alignment with the lower end of the brace 220 (see FIGURE 11). Thus, before the relatively heavy cutter assembly 210 is lowered or even before it is attached to the guide member 206, the proper orientation of the guide member 206 may be determined and the position of the pointed anchor 224 in relation to the ground surface 184 may be determined. At this point, the valve 288 may be opened and the guide member 206 moved in a rotary manner about its axis of rotation thus forming a circular mark on the ground surface through which the anchor 224 should extend. This will enable proper positioning of the guide member 206 even though the relatively heavy cutter assembly is supported thereon so that the position of the guide member 206 may be indicated around the base of the tree. Thus, as each increment of trimming is completed, the telescopic brace assembly 220 may be collapsed and the guide member moved to a new position and the indicating line which may be provided by white chalk dust, lime, fertilizer or the like will indicate the position of the lower end of the telescopic brace or anchor 220 for the guide member 206.

As illustrated in FIGURE 12, the attaching portion 202 of the guide member 206 may have a plurality of vertical holes 203 therein for enabling lateral adjustment of the guide member 206 and also enable reception of the lower end of the sighting rod 200. A similar ball detent lock may be provided for the sighting rod 200 if deemed necessary and also a similar retaining brake or latch 296 may be provided for the tubular support 196 to retain the upper end of the guide member 206 in adjusted position.

The double articulate connection between the arcuate member 268 and the sleeve 188 at one end and the plate 264 at the other end enables the leg 168 to be effectively employed as a manipulatable prop or brace for orientating the rotary head 162 in the desired position. After the device has been set up and orientated in the desired relation to the tree so that the guide member 206 will generate a cone when pivoted about the axis of the tubular support member 196, the cutter assembly may be energized and moved upwardly and downwardly and as the cutting assembly completes one increment of trimming or shaping, the guide member 206 is moved to a new position and the operation repeated.

By using longer adapters in lieu of member 268 and an extension between lug 258 and leg 168, the cutter may be moved in various patterns such as spherical or columnar to enable maples, Lombardy poplars, etc. to be shaped.

The structure illustrated in FIGURES 9–14 is primarily intended for use with relatively large trees such as trees or evergreens which are ten feet or over in height and enables the entire trimming, shaping and cutting operation to be performed from the ground without requiring ladders. This also enables the shaping operation to be conducted by a single person rather than a plurality of persons inasmuch as one person normally observes the shape and configuration of the tree and supervises the person actually doing the trimming. With this arrangement, a predetermined shape may be provided and such shape will be accurately completed in an expeditious manner.

While cutting apparatuses having a rotary blade either of the flat rotary blade type or the type having laterally extending cutting surfaces have been illustrated, it is pointed out that various other cutting apparatuses may be employed such as the conventional type of hedge trimmer including a riciprocating blade assembly. Also, an endless chain saw type of cutter assembly may be employed or any other suitable type of cutting assembly which may either be motor operated or manually operated. Various trees may be effectively shaped and trimmed and also various bushes, shrubs and the like. For example, the conical configuration is quite well adapted for use in trimming and shaping blue spruce or the like while the spherical configuration may be best adapted for use with various types of yews. Also, the principles of the invention may be employed for trimming hedges by positioning the standards on horizontally disposed guide tracks, a wheeled dolly or the like. This will enable the reciprocating type of hedge trimmer to be employed for trimming both the top surface of the hedge as well as both side surfaces thereof inasmuch as the stands illustrated in FIGURES 1–8 may be orientated in straddling relation to the hedge and movably supported on guide tracks or the like which have been previously laid out in a desired position in relation to the hedge being trimmed.

Referring now specifically to FIGURES 15–18, another form of the invention is illustrated and designated generally by reference numeral 300. This form of the invention is especially useful in movement along the top cap 302 of a retaining wall 304 or alongside of the retaining wall 304 on a concrete walk surface or the like designated at 306. The retaining wall 304 will normally serve to retain soil 308 having shrubs, bushes, hedges or the like 310 growing therein such as may be found in shopping centers, apartment developments and other landscaped areas.

The trimmer and shaper 300 includes a besa plate 312 generally corresponding to the base plate 28 as illustrated in FIGURE 1 and which includes a pair of sockets 314 and 316 in the undersurface thereof for receiving projecting dowels 318 and 320 carried by the top plate 322 of a dolly structure which rollingly supports the trimmer and shaper 300 on the top cap 302 or on the concrete surface 306. The top surface of the base plate 312 has an upstanding guide rod 324 attached thereto such as by a screw threaded connection such as illustrated for connecting the guide rod 34 to the base plate 28 in FIGURE 5. Also, a threaded rod 326 is attached to the base plate 312 by a bearing structure 328 and a retaining member 330 similar to the manner in which the threaded rod 46 is rotatably attached to the plate 28 in FIG. 5 so that the threaded rod 326 may be rotated. The upper end of the guide rod 324 is provided with a retaining cap 332 and the upper end of the threaded rod 326 is provided with a handwheel 334 having an upwardly extending handle 336 projecting upwardly from the periphery thereof. Slideable on the guide rod 324 and threaded on the threaded rod 326 is a supporting bracket structure generally designated by numeral 338 which corresponds in structure to the structure of the bracket 54 in the structure disclosed in FIGURES 1–3 and the bracket 338 is not illustrated in detail but includes a laterally extending adjustable rod 340 corresponding to the rod 76 in FIGURE 3. Supported on the outer end of the rod 340 is a supporting head 342 corresponding to the supporting head 26 with the lower end of the support member 344 which corresponds to the support member 100 in FIGURE 5. Also, a threaded rod 326 is attached to the base posed perpendicular thereto which rod 346 is employed in lieu of the guide member 128 illustrated in FIGURE 4 and disposed in perpendicular relation to the longitudinal axis of the support member 344.

One end of the support rod 346 is provided with an adjustable assembly 348 which carries a cutter assembly 350 which has a power unit 352 associated therewith for trimming and shaping the shrub or bush 310. The specific details of the support rod 346, the adjustable connecting assembly 348 and the cutter assembly 350 are not specifically illustrated in FIGURES 15–18 since this structure may be used to support various types of cutting assemblies in various adjusted positions.

For supporting the base plate 312 movably on the top cap 302, the top plate 322 is provided with depending edge flanges 354 and 356 which receive axle bolts 358 and 360 therethrough. Journaled on each of the axle bolts 358 and 360 is a pair of wheels 362 with each wheel having a peripherally extending flange 364 at the outer edge thereof. The flange 364 adjacent the depending flange 356 bears against the inner surface of the flange 356 and the flange 364 adjacent the depending flange 354 bears against a movable plate 366 which is disposed between the wheel 362 and the depending flange 354 on the top plate 322 so that as the plate 366 is moved longitudinally on the axle bolts 358 and 360, the spatial distance between the flanges 364 as well as the spatial distance between the wheels 362 may be adjusted thereby enabling the four flanged wheels 362 to engage over the edges of top caps 302 having different widths. Surrounding each of the axle bolts 358 and 360 and abutting against the inner surfaces of the flanged wheels 362 is a coil spring 368 which is a compression spring and urges the wheels 362 outwardly for retaining the wheels 362 in their outermost positions against the flange 356 and movable plate 366 respectively.

For moving the plate 366, a centrally disposed actuating rod 370 is provided which is journaled in the flanges 354 and 356. Where the rod 370 extends through the flange 356, a collar 372 is provided thereon for engaging the inner surface of the flange 356 and a handle 374 is attached to the outer end of the rod or shaft 370 and engages the outer surface of the flange 356 so that upon rotation of the handle 374, the rod or shaft 370 will be rotated and will be precluded from longitudinal movement in relation to the flange 356 and also the flange 354 which of course is rigid with the top plate 322. A retaining nut 376 may be locked to the opposite end of the shaft or rod 370 to stabilize it in relation to the depending flange 354 so that the rod or shaft 370 will freely rotate in relation to the depending flanges 354 and 356 but will not move longitudinally or axially in relation thereto.

The end portion of the shaft or rod 370 where it extends through the movable plate 366 is threaded as at 378 and an internally threaded nut 380 is rigidly fixed to the center part of the movable plate 366 and is threadedly engaged with the threaded portion 378 of the shaft or rod 370 so that upon rotation of the shaft or rod 370, the plate 366 will be moved axially of the shaft or rod 370 or toward or away from the stationary depending flange 354 depending upon the direction of rotation of the handle 374 and shaft or rod 370 thereby enabling adjustment of the distance between the flanged wheels 362 and specifically the flanges 364 thereon. The specific relationship of the flanged wheels and the top cap 302 is illustrated in FIGURE 18 and it is noted that the periphery of the flanged wheels extends below the bottom edges of the depending flanges 354 and 356 so that when the handle 374 is in the upright position as illustrated in FIGURE 18, the flanged wheels 362 may rollingly engage a supporting surface such as the concrete walkway 306 alongside of the retaining wall so that the cutting and trimming assembly 350 may be supported from a retaining wall or a supporting surface alongside of a landscaped area which does not have a retaining wall or if the retaining wall is such that it will not properly support the dolly structure.

FIGURES 19–21 illustrate a supporting and adjusting assembly 400 adapted to be connected to any of the supporting heads such as 26 in FIGURE 1 or 342 in FIGURE 15 and includes a supporting arm or rod 402 which is longitudinally adjustable and provided with a graduated scale 404 thereon and apertures 406 disposed at one inch centers for adjusting the lateral position of the support arm 402 in relation to the supporting head which is illustrated in dotted line in FIGURE 19. As illustrated in FIGURE 21, the supporting arm 402 is in the form of a bar which has a rounded end 408 received between a pair of generally circular ears or lugs 410 rigidly affixed to a cylindrical sleeve 412 with the lugs 410 being welded thereto as at 414 and extending laterally therefrom in substantially parallel relation for receiving the end of the arm 402 therebetween. The arm 402 is pivotally attached to the lugs 410 by a pivot bolt 416. The pivot bolt 416 has a wing type handle 418 on one end thereof to enable loosening and tightening thereof through a nut 420 which may be fixedly attached to the opposite lug. Friction washers 422 may be disposed between the lugs 410 and the arm or bar 402 to aid in locking the sleeve 412 in adjusted position in relation to the arm 402 about the pivot axis defined by the bolt 416. If desired, matching serrations may be provided on the arm or bar 402 and the inner surfaces of the lugs 410 to further enable rigid but adjustable locking of the sleeve 412 in relation to the arm or bar 402.

For indicating the angular position of the axis of the sleeve 412 in relation to the longitudinal axis of the bar 402, an index pointer 424 is provided on either or both sides of the arm or bar 402 for association with the periphery of either or both of the lugs 410 which have a graduated degree scale 426 on the outer surface thereof. While the lugs or ears 410 are substantially rigid, they are sufficiently flexible to enable locking and unlocking of the lugs in relation to the arm or bar 402 by tightening or loosening the pivot bolt 416 by twisting the wing type handle 418.

Rotatably journaled in the sleeve 412 is a cylindrical member 428 having a flange 430 adjacent the lower end thereof which engages the lower end of the sleeve 412. The upper end of the sleeve 412 is provided with an integral flange 432 integral therewith which has a plurality of arcuately arranged sockets 434 therein adjacent the periphery thereof and a central hole 436 which receives therethrough an elongated rod 438. The rod 438 has a plate 440 integral with the upper end thereof with the plate 440 having a depending pin 442 for engagement in one of the sockets 434 in the flange or plate 432. Also, the plate 440 is provided with a loop-type or eye-type handle 444 by which the plate 440 may be lifted along with the rod 438 for elevating the pin 442 so that the rod 438 may be rotated and then locked into position by dropping the pin 442 into one of the sockets 434. As illustrated in FIGURE 21, the plate 440 is provided with a pointer 446 at the periphery thereof for association with a graduated scale 448 on the periphery of the flange 432 thereby enabling the angular position of the plate 440 to be adjusted in relation to the flange 432.

Depending from the end of the cylindrical member 428 is an integral downwardly extending square tubular shaft 450 provided with opposed longitudinally extending recesses 452 therein. The lower end of the round rod 438 is square as at 439 and extends into the tubular square shaft 450 and receives a corresponding square washer or plate 454 thereon with the washer or plate 454 being longitudinally movable in the tubular square shaft 450 but being non-rotatable in relation thereto. A coil compression spring 456 engages the upper surface of the plate or washer 454 and encircles the rod 438 and has the upper end thereof engaging a thrust flange 458 which is rigid with cylindrical member 428, movable on the rod 438 and engages the inner surface of the flange 432 thus retaining the plate 440 urged downwardly against the flange 432 and retaining the pin 442 in one of the sockets 432 until the force of the spring 456 is overcome by lifting upon the handle 444. For locking the washer 454 onto the shaft 438, a transversely extending pin 460 is provided with the pin having an enlarged head 462 which is received in a recess 464 in the lower surface of the washer 454 thereby preventing accidental withdrawal of the pin 460. The interconnection between the shaft or rod 438 and the washer 454 with the lower end of the shaft 438 and the corresponding aperture in the washer or plate 454 being polygonal effectively locks the tubular shaft 450, the washer or plate 454, the rod 438, the plate 440 in non-rotatable relation to each other although the rod 438, plate 440 and washer 454 may reciprocate in relation to the tubular shaft 450. The tubular shaft 450 is provided with a suitable opening 466 to provide access to the pin 460 to enable removal thereof to provide for assembly and disassembly of the components of the adjustment for swiveling movement of the tubular shaft 450 in relation to the sleeve 412.

The lower end of the square hollow shaft 450 has a tubular collar 468 which slidably encircles the tubular square shaft 450 and has outwardly offset recesses 470 aligned with the grooves 452. A wing-type clamp 472 is provided in the outer wall of the collar 468 and the inner end thereof is received in the groove 452 in order to lock the square collar 468 longitudinally in relation to the square tubular shaft 450 with the square collar 468 and the square shaft or tube 450 being closely concentric to prevent any relative rotational movement therebetween.

The side of the collar 468 opposite from the thumb screw 472 is provided with a laterally extending boss or projection 474 having an internally threaded bore 476 threadedly receiving the inner end of a retaining bolt 478 which has a cylindrical headed outer end 480. The bolt 478 extends through a sleeve member 482 having a hollow area 484 spaced from the bolt 478 and receiving a coil compression spring 486 therein with the spring 486 encircling the bolt 478 and engaging the sleeve 482 where the hollow area 484 terminates for urging the sleeve towards the boss 474. Where relative rotation between the sleeve 482 and the boss 474 occurs, these two components have matching and interengaging axially extending teeth or serrations 488 so that the spring 486 will retain the teeth 488 in engaged position and enable relative rotation of the sleeve 482 about the axis of the bolt 478 in relation to the boss 474 inasmuch as the outer end of the spring 486 engages the head 480 of the bolt.

Fixedly attached to the outer end of the sleeve 482 is a mounting plate 490 secured to the sleeve 482 as by welding 492 or the like. The mounting plate 490 is provided with an opening 494 to enable access to the head of the bolt 480 for disassembling the bolt and enabling adjustment thereof by employing a suitable instrument such as a screw driver in a kerf.

Attached to the mounting plate 490 is a guide plate 496 having a longitudinal slot 498 therein receiving bolts 500 which are headed as at 502 and provided with enlargements 504 thereon which shoulder against the mounting plate 490 and are movably received in the slot 498 so that the guide plate 496 can slidingly reciprocate in relation to the mounting plate 490.

The guide plate 496 is a component of a conventional chain type shrub trimmer which is schematically illustrated and generally designated by the numeral 506 with the chain cutter element 508 moving past stationary cutter teeth 509 carried by guide plate 496 and mounted thereon in a completedly conventional manner. The chain cutting element 508 is driven by a power unit such as an electric motor 510 connected to a suitable source of electrical energy and drivingly connected to the chain cutter element 508 in a conventional and well known manner. The motor 510 is provided with an adapter 512 threadedly and detachably receiving a handle 514 by a threaded connection 516 so that the type and length of the handle 514 may be varied for enabling variation in the position of the trimmer 506. A setscrew 517 is provided in mounting plate 490 to lock cutter assembly 506 in desired position.

Thus, with the present construction as illustrated in FIGURES 19–21, the positional attitude of the cutting element 506 may be adjusted horizontally by adjusting the arm 402 in relation to the supporting head therefor, about a horizontal axis defined by the pivot bolt 416, about a vertically inclined axis defined by the rod 438, longitudinally of the square shaft 450 by sliding movement of the collar 468 thereon, pivotally about an axis defined by the pivot bolt 478 and of course the guide plate 496 is movable on the shouldered fasteners by exerting appropriate longitudinal force on the handle 514.

In order to prevent the collar 468 from dropping off of the tubular square shaft 450, a retainer 518 is provided at the lower end of the square shaft 450 which is in the nature of a cotter pin extending through the lower end of the tubular square shaft 450 as illustrated in FIGURE 19.

FIGURES 22–24 illustrate another embodiment of supporting assembly 530 which is adapted to be supported from a supporting head such as the supporting head 342 in the same manner as the structure illustrated in FIGURES 19–21. In this embodiment of the invention, a tubular shaft 532 is provided which has diametrically extending holes 534 therethrough at longitudinally spaced points therealong to enable longitudinal adjustment of the tubular arm 532. One end of the arm 532 is provided with an axial extension 536 of reduced diameter and which is of solid construction and provided with a plurality of circumferentially spaced recesses 538 in the center thereof and a peripheral groove 540 adjacent the outer end thereof. A sleeve or collar 542 of generally cylindrical construction is rotatably journaled on the solid extension 536 and includes an Allen-type setscrew 544 having an inwardly extending stud 546 thereon for engagement in one of the recesses 538 for locking the sleeve 542 in rotated or adjusted angular position on the solid extension 536. A split snap ring 548 is provided for retaining the collar 542 on the extension 536 and is snapped into engagement with the groove 540 and in engagement with the outer end of the collar 542 which has the inner end engaging the shoulder 550 between the solid extension 536 and the hollow tubular arm 532.

Integral with the collar 542 is a radially extending tubular member 552 which is diametrically opposed to the setscrew 544 which terminates in an externally threaded outer end portion 554. The tubular member 552 rotatably receives the end of a hollow tubular supporting arm 556 which has a circumferential flange 558 thereon engaging the lower end of the tubular member 552 and rotatably retained thereagainst by a retaining cap 560 which is threaded onto the threaded portion 554 of the tubular member 552. The upper or inner end of the support member 556 is provided with a plurality of circumferentially spaced recesses 562 similar to the recesses 538 and which receive an Allen lock screw 564 threaded through the tubular member 552 to lock the support member 556 in rotated position about its longitudinal axis by loosening and tightening the Allen setscrew 564.

The lower end of the tubular support member 556 is provided with an offset circular pivot plate or lug 566 which coacts with a similar circular pivot plate 568 carried by a tubular support member 570. The two circular pivot plates 566 and 568 are pivotally interconnected by a pivot bolt 572 as illustrated in FIGURE 23 which includes a wing nut 574 on one end thereof and a rounded head 576 on the other end which includes a polygonal projection 578 on the undersurface thereof for reception in a corresponding recess in the pivot plate 568 thus preventing free rotation of the pivot bolt 572.

The pivot plate 566 is provided with an inwardly extending cylindrical projection 580 which is rotatably received in and is telescopic within a tubular projection 582 on the inner surface of a pivot plate 568 thus stabilizing the pivot plates and guiding the pivot plates in relation to each other. Also, the inner surfaces of the pivot plates 568 have matching recesses 584 and 586 respectively for receiving a compression coil spring 588 which urges the pivot plates 566 and 568 apart from each other.

Outwardly of the recesses 584 and 586 the matching faces of the pivot plates 566 and 568 are provided with radial serrations 590 which serve to lock the pivot plates 566 and 568 in adjusted angular positions. The plate 568 is provided with a graduated degree scale 592 on the outer surface thereof for association with an index pointer 594 on the support member 556 thereby indicating the adjusted angular position of the support member 570 in relation to the support member 556 about the pivot bolt 572.

Journaled in the tubular support 570 for rotation about the longitudinal axis thereof is a projecting adapter 596 corresponding to the adapter 512 illustrated in FIGURE 19 which is retained rotatably within the sleeve-like support member 570 by a pair of Allen setscrews 598. The cutter assembly generally designated by the numeral 600 includes the motor unit 602 and the endless type cutting blade unit 604. The motor 602 may be rotated about the longitudinal axis of the tubular support sleeve 570 and of course, the angular position of the cutting assembly 604 may be varied longitudinally along with the arm 532, adjustably about the axis of the extension 536, adjustably about the axis of the support member 556, adjustably about the pivot pin or bolt 572 and adjustably about the longitudinal center of the tubular support sleeve 570. The setscrews 598 not only lock the motor in position but serve as a guide when loosened.

FIGURE 24 illustrates one manner of use of the cutting assemblies with the supporting assembly being that illustrated in FIGURES 19–21 so that the shrub 310 may be cut with side surfaces that are perpendicular to each other or at any other desired angle by virtue of orientating the cutting assembly 506 in a vertical plane and moving the cutting assemblies vertically on the tubular square shaft 450. By orientating the tubular shaft 450 in an angular position, any type of slope may be provided on the side surfaces or the top and bottom surfaces of a shrub, bush or the like. A completely flat surface may be provided on the top or an inclined conical surface may be provided with the center coming to a point or a portion of the center of the shrub left uncut depending upon the particular desires of the individual using the device. By using the device such as illustrated in FIGURES 22 and 23, arcuate recesses may be formed in a hedge row for example or any curved surface desired may be provided as well as flat surfaces or smoothly inclined surfaces by virtue of the universatility of the adjustment capabilities of the cutting assemblies.

The structural features of the various embodiments of the invention may employ conventional and readily available hardware components and the specially constructed components may be cast or otherwise formed of any suitable material having the necessary strength characteristics and where relative movement occurs, lubrication facilities may be incorporated to facilitate such movement and to prolong the useful life of the components and reduce wear in the moving components of the invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. A shaping and trimming device for shubbery comprising a supporting head adapted to be orientated above a shrub, means on said head forming a downwardly extending cutter guide means for movement peripherally around the shrub, and means supporting said head in overlying relation to the shrub, said means for supporting the head including a supporting stand, said stand including means for vertically and laterally adjusting the position of the head, said head including a sleeve, a tubular support extending through the sleeve, bearing means journalling the tubular support on the sleeve, said guide means being attached to the tubular support for movement in a circular path about the periphery of the shrub.

2. The structure as defined in claim 1 together with means detachably connecting the guide means to the tubular support for enabling interchanging thereof.

3. The structure as defined in claim 2 wherein said means interconnecting the guide means and the tubular support includes an elongated sighting rod extending above the tubular support and terminating in a laterally extending portion in perpendicular relation to the portion received in the tubular support for enabling the angular position of the tubular support in relation to the vertical and horizontal planes to be determined thereby enabling the sighting rod and rotational axis of the tubular support to be orientated in alignment with the axis of symmetry of the shrub.

4. A device for use when trimming shrubbery comprising a supporting head, means adjustably supporting said head in overlying relation to a shrub, and means swingably supported by said head for movement about an axis intersecting with the shrub, said swingably supported means adapted to be engaged by a cutting means when trimming the shrub.

5. The structure as defined in claim 4 wherein said means for supporting the head includes a supporting stand, said stand including means for vertically and laterally adjusting the position of the head.

6. The structure as defined in claim 5 wherein said stand includes a base plate adapted to be supported on the ground surface, an upright standard attached to the base plate, a laterally extending arm carried by the standard for vertical and lateral adjustment, and means adjustably supporting the head at the end of said arm.

7. The structure as defined in claim 6 wherein said arm includes a threaded rod operatively associated therewith and operatively associated with the base for raising and lowering the arm in relation to the base.

8. The structure as defined in claim 3 wherein said means adjustably supporting the head at the end of said arm includes a lateral projecting lug on said head, means connecting said lug to said arm for pivotal movement about a generally horizontal axis, and means interconnecting the head and arm in spaced relation to the pivot axis therebetween for locking the head and arm in adjusted position.

9. The structure as defined in claim 8 wherein said guide means is in the form of a guide rod having an attaching portion extending through the lower end of the head in a lateral direction and a guiding portion having a predetermined orientation for guiding a cutting implement while trimming the shrub.

10. The structure as defined in claim 4 wherein said means for supporting the head includes a tripod structure including three downwardly diverging legs, each of said legs being longitudinally telescopic to enable adjustment of the height of the head and adjustment of the position of the head in relation to a shrub.

11. The structure as defined in claim 10 wherein two of said legs are connected to an angulated plate, a relatively short articulated connecting member pivotally connected to the plate and to the head for enabling orientation of the head in predetermined relation to the axis of symmetry of the shrub.

12. The structure as defined in claim 11 wherein said cutter guide means is in the form of an elongated guide member consisting of a pair of spaced tubes defining a slot longitudinally thereof, means at the lower end of the guide engaging the ground surface, said elongated member adapted to guide a cutter assembly movably in the slot for trimming the shrub as it moves longitudinally along the slot.

13. The structure as defined in claim 12 wherein said elongated guide member includes a pulley block and pulley mounted at the upper end thereof, a flexible line entrained over the cable pulley and adapted to be connected to the cutter assembly at one end thereof and having the other end operable by an operator to move the cutting assembly along the slot.

14. The structure as defined in claim 13 wherein said guide means includes a marking member at the lower end thereof for marking the circular path of movement of the lower end of the guide member to enable accurate positioning thereof during the cutting operation.

15. The structure as defined in claim 4 wherein said means adjustably supporting the head includes a stand, and means movably supporting the stand in relation to a supporting surface, said last named means including a plurality of rotatable wheels rollingly engaging a supporting surface.

16. The structure as defined in claim 15 wherein each of said wheels is flanged with the flanges being orientated in opposed remote relation for engaging the side walls of the top cap of a retaining wall or a supporting surface alongside of a landscaped area.

17. The structure as defined in claim 16 wherein said flanged wheels are orientated in opposed pairs, one flanged wheel of each pair being adjustable toward the other of the wheels in each pair for enabling the flanged wheels to engage the side walls of a top cap of various widths.

18. The structure as defined in claim 17 wherein said stand is detachably supported from the wheels to enable the stand to be used separate from the wheels.

19. The structure as defined in claim 15 wherein said swingably supported means includes a generally horizontally disposed arm adjustably connected to the supporting head for reciprocatory movement, a depending support member carried by one end of said arm and adapted to support a cutter means at the lower end thereof.

20. The structure as defined in claim 19 wherein said support member is adjustable about perpendicular axes at the end of the supporting arm, and means locking the support member in adjusted position about both of the axes.

21. The structure as defined in claim 20 wherein said support member is a tubular square shaft, a square collar slidably received on the square shaft and lockingly disposed in longitudinally adjusted position thereon, a guide plate adapted to support the cutter means, a mounting plate connected to the guide plate to enable longitudinal sliding movement of the guide plate, and means connecting the mounting plate to the collar for pivotal movement of the guiding plate and mounting plate about an axis perpendicular to the square shaft.

22. The structure as defined in claim 4 wherein said swingably supported means includes an elongated rod, means detachably supporting the upper end of said rod to said head for interchanging the rod with other rods, said rod including a guiding portion having a predetermined orientation for engagement by a cutting means when trimming a shrub.

References Cited

UNITED STATES PATENTS

| | | | |
|---|---|---|---|
| 1,869,394 | 8/1932 | Sikma | 56—235 |
| 2,762,186 | 9/1956 | Janata | 56—233 |
| 2,798,354 | 7/1957 | O'Brien et al. | 56—235 |
| 3,016,674 | 1/1962 | Pounders | 56—236 |
| 3,025,655 | 3/1962 | Couchot | 56—233 |

FOREIGN PATENTS 170,948   1905   Germany.

ANTONIO F. GUIDA, Primary Examiner

P. A. RAZZANO, Assistant Examiner

U.S. Cl. X.R.

143—43